(12) United States Patent
Yanovsky et al.

(10) Patent No.: US 6,185,311 B1
(45) Date of Patent: Feb. 6, 2001

(54) KEY IMAGING SYSTEM

(76) Inventors: Vladislav Yanovsky, 14 Eulita Ter., Brighton, MA (US) 02135; Anatoliy Sirota, 81 Hackensack Rd., West Roxbury, MA (US) 02467

( * ) Notice: Under 35 U.S.C. 154(b), the term of this patent shall be extended for 0 days.

(21) Appl. No.: 08/912,329

(22) Filed: Aug. 18, 1997

(51) Int. Cl.[7] .................................................. G06K 9/00
(52) U.S. Cl. ............................. 382/100; 76/110; 409/93; 409/96
(58) Field of Search ................................ 382/100, 115, 382/141, 209, 218; 356/383, 376; 211/120; 364/474; 378/293; 350/132; 340/172; 76/110; 250/202; 70/406, 409; 348/61, 86; 409/81, 93, 85, 94, 96

(56) References Cited

U.S. PATENT DOCUMENTS

| | | | |
|---|---|---|---|
| 3,599,147 | * | 8/1971 | Rogers ............................... 340/146.3 |
| 3,707,999 | * | 1/1973 | Coats ..................................... 83/438 |
| 3,848,235 | * | 11/1974 | Lewis et al. ........................ 340/172 |
| 3,955,179 | * | 5/1976 | Planke ............................... 340/146.3 |
| 4,166,949 | * | 9/1979 | Pöld et al. ....................... 250/223 B |
| 4,171,161 | * | 10/1979 | Jung ..................................... 356/383 |
| 4,172,632 | * | 10/1979 | Holmes, Jr. ........................... 350/132 |
| 4,625,107 | * | 11/1986 | Planke .............................. 250/233 B |
| 4,839,913 | * | 6/1989 | Annis et al. .......................... 378/293 |
| 4,899,391 | * | 2/1990 | Cimino et al. ....................... 382/100 |
| 5,127,532 | * | 7/1992 | Cimino et al. ....................... 211/120 |
| 5,311,286 | * | 5/1994 | Pike ..................................... 356/371 |
| 5,617,323 | * | 4/1997 | Stansberry et al. ............. 364/474.03 |
| 5,807,042 | * | 9/1998 | Almblad et al. ....................... 409/83 |
| 5,908,273 | * | 6/1999 | Titus et al. ............................ 409/83 |

* cited by examiner

*Primary Examiner*—Bhavesh Mehta

(57) ABSTRACT

A key imaging system for identifying and matching a key blank with an original key when duplicating an original key by placing the key on a supporting flat surface and forming images of the grooves and indentations on the shank of the original key by illuminating the lateral surface containing the grooves and indentations and imaging those grooves and indentations by reflecting light off of the surrounding reflective surface and scattering light off of the grooves and indentations. The resultant images are scanned and recorded by means of a digital video camera/scanner. The scanned image is relayed to a computer where it is saved in computer memory. The saved image is compared to previously stored known original key blank images for the purpose of indicating a precise duplicate key blank matching the original key.

2 Claims, 3 Drawing Sheets

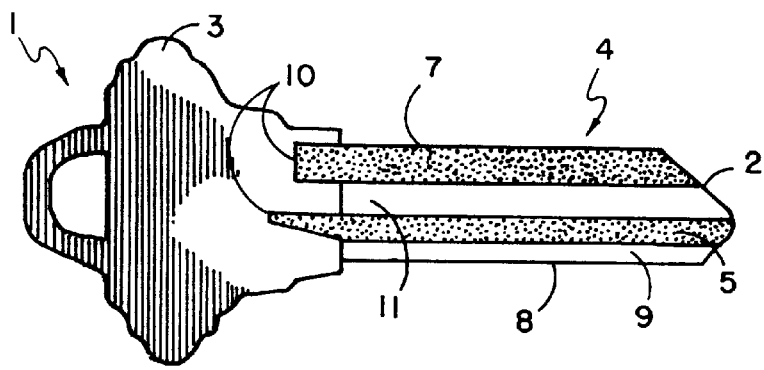
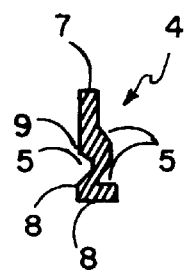
FIG. 1A          FIG. 1B
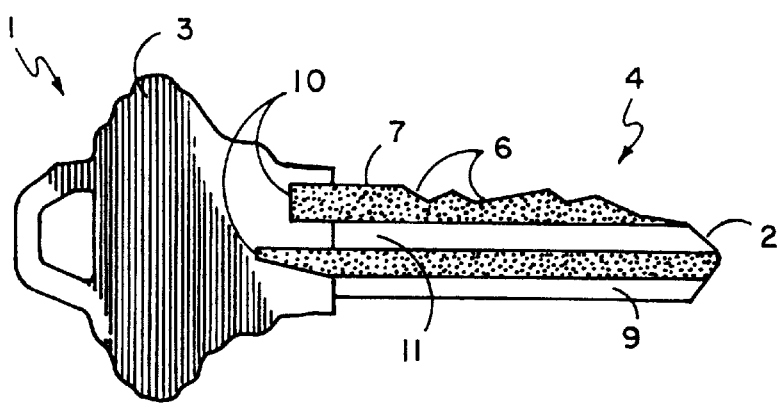
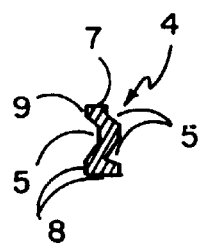
FIG. 2A          FIG. 2B
          
FIG. 3A          FIG. 3B

KEY IMAGING SYSTEM

BACKGROUND OF THE INVENTION

1. Field of the Invention

This invention relates to the field of computer data entry devices and more particularly to automatic key identification devices.

2. Description of the Prior Art

It is common knowledge that key manufacturers code and identify their keys by series of grooves and indentations on lateral surfaces of the key. This system of key coding allows for a great number of different key combinations, thus increasing security and reducing chances for identical key combinations. Currently over 10,000 key styles are in use. At this time, locksmiths rely on the manual method of key blank identification in order to duplicate the key. This process relies on knowledge, skill and experience of the individual locksmith in order for it to be precise and cost effective. However, the greatest number of errors in key duplication occurs with the incorrect selection of the key blank since the differences in the aforementioned grooves and indentations are often too minute for correct manual identification. A mistake in selection usually results in repeated duplication using yet another key blank, additional costs acquired due to the locksmith's time, and possible loss of business. At this time there are systems of automatic key identification which identify keys through analysis of the front tip of the key. One example of such a system is U.S. Pat. No. 4,899,391 of William J. Cimino and Robert E. Powers. Also known is the key holding system as part of the automatic key identification system disclosed in U.S. Pat. No. 5,127,532 of William J. Cimino and Robert E. Powers. Also known to the inventors is the shadow image acquisition device which is part of an automatic key identification system of pending application Ser. No. 08/758,481 filed Aug. 18, 1997 by one of the inventors herein, Vladislav Yanovsky. In this system the key to be duplicated is inserted into the shadow image acquisition device which provides rear to front illumination by projecting light rays along the grooves and indentations located on the sides of the key. The scanner converts the shadow image into a digital signal. The digital signal is passed to the computer where the image is stored and compared to saved images of key blanks. When a match is made between the key image and the stored blank, the user is notified of the proper key blank to be used for duplication. This system is more precise than the system described in U.S. Pat. No. 5,127,532. However, both of these systems have several inherent disadvantages which are similar in nature:

1. The actual height of the shank of the inserted key differs greatly from the heights of the shanks of the stored images. The variance in size can be 35% of a single side to 50% of double-sided keys. This is clearly shown in FIGS. 1A, 1B, 2A and 2B. FIG. 1A shows a side view of an uncut key blank. FIG. 1B shows the front cross-section of said key blank. FIG. 2A represents the same key which was notched (cut) along top 7. FIG. 2B shows the front cross-section of the key displayed in FIG. 2A. When comparing FIG. 1B to FIG. 2B a difference in size can be clearly seen. This is of particular interest when compared to stored cross-sectional images of different key blanks shown in FIGS. 3A and 3B. These images may be selected by the automated system as correct blanks;
2. The key blanks are further differentiated by measuring grooves and indentations 5 along shank 4 (FIGS. 1B and 2B). As plainly seen in FIGS. 1B and 2B grooves and indentations 5 are rather small and complex geometric shapes which are difficult to visualize and compare due to a small surface area. Analysis of grooves and indentations 10 of FIGS. 1A and 2A based on the lateral scan of the key blank presents a larger surface area for examination and comparison;
3. Due to wear and tear on the key, the geometric shape of its front cross-section changes, causing errors in identification;
4. Correct projection of the front cross-section of a key depends greatly on the holding device which will hold the key in a desired position relative to the light source. Any deviation from the desired position will cause optical distortion and errors in identification;
5. Evaluation of the front cross-section of a key does not allow for measurement of the key's length;
6. Evaluation of the front cross-section of a key does not allow for detection of notches of top 7 which is necessary for actual duplication of the key; and
7. Evaluation of the front cross-section does not allow for the evaluation of the head of the key which often times serves as a differentiating factor during identification.

SUMMARY OF THE INVENTION

It is the object of this invention to improve the accuracy of automatic key identification by providing images of grooves and indentations (5 of FIGS. 1A and 2A) as well as direct images of flat portions (11 and 9 of FIGS. 1A and 2A) of the shank of the key. These objectives can be accomplished when the light source and the lens of the camera are positioned perpendicularly to the shank of the key (1 of FIG. 6) and when the light rays strike the flat surfaces of the shank and are reflected directly into the camera, forming a direct image of the flat surfaces of shank 4 of key 1. However, when the light rays strike the surfaces of the grooves and indentations 5 on shank 4 of key 1 (FIG. 6), they are reflected in all directions other than directly back into the lens of the camera (FIG. 6), thereby yielding an image of the grooves and indentations on said shank of key 1 surrounded by the direct image of the flat surfaces 11 of key 1 of FIGS. 1A and 2A.

When comparing the scanable surfaces of grooves and indentations 5 of FIGS. 1A and 1B, it is clearly seen that FIG. 1A has a larger surface area as well as a better defined geometrical shape than FIG. 1B. Therefore:

1. The larger surface area of the image of FIG. 1A allows a higher resolution and thereby better identification of the image of FIG. 1B;
2. A lower resolution scanner or camera can be utilized for simplicity of design as well as for cost effectiveness; and
3. The image of the grooves and indentations 10 of head 3 of key 1 can be seen in FIG. 1A but cannot be seen in FIG. 1B.

The image of grooves and indentations 10 on head 3 of key 1 precisely reflects the geometrical shape of grooves and indentations 5 on shank 4 of key 1 and therefore are themselves an evaluating factor for identification. When examining the side elevational view of the shank 4 of the key 1 of FIG. 1A, other identifying structures which are not available when viewing the front cross-section of FIG. 1B may be evaluated. For instance, the length of the shank of the key may be evaluated as well as individualized notches 6 on FIG. 2A. These evaluations will allow for a more precise key blank identification since the length of the shank of the key is also used as an evaluating factor by locksmiths. Furthermore, scanning of the individualized notches 6 in FIG. 2A will allow for a full range of evaluation parameters to be scanned in for further identification and storage.

Thus it is the object of this invention to provide at least the following features:

1. The apparatus and method according to this invention forms images of the grooves and indentations 5 on shank 4 of key 1 of FIG. 2A such that the image of the grooves and indentations 5 and 10 of a notched key and unnotched key is identical and unchanged in their geometrical structure even when key 1 is uniquely notched, as seen in notches 6 of FIG. 2A. This process dramatically increases the probability of a precise match.

2. Since indentations 5 on the shank 4 of key 1 do not actively participate in the operation of the lock and are spared the wear and tear which distort the grooves and indentations at tip 2 of shank 4 on key 1, the images of the lateral surfaces according to this invention dramatically increases the probability of a precise match.

3. The shadow trace images of the lateral surface of shank 4 of key 1 has a much larger surface area than the surface area of the front cross-section of the front tip of key 1. The larger surface area is easier to scan and identify. Using FIG. 1A as an example, imaging the lateral surface images the grooves and indentations 5 in FIG. 1A throughout shank 4, and the shadow trace images may be calculated using the entire length of shank 4, whereas imaging the front cross-section only allows the measurement of space a–b of FIG. 1B which image is much smaller and harder to measure precisely.

4. The length of the key also serves as an identifying factor of the key. Often times keys may have identical cross-sections but different lengths of the shank, making the two keys' blanks different.

5. Scanning of the lateral surfaces of the key allows for measurement of the length of its shank as well as imaging the grooves and indentations 5 and 10. Therefore, scanning of the front cross-section does not allow lateral surface scanning and scanning of the unique notches 6 of top 7 of key 1 which process excludes yet another factor which aids in key blank identification.

6. There is no need for a holding device which secures the key in a specific position as required for the evaluation of the front cross-section.

7. The head 3 of key 1 can also serve as an identifying feature. Other and further objects, as well as various advantages and features of novelty which characterize the invention, are pointed out with particularity in the claims annexed hereto and form a part hereof. However, for a better understanding of this invention, its advantages and objects obtained by its use, reference should be had to the drawings which form a further part hereof and to the accompanying descriptive matter, in which there is illustrated and described a preferred embodiment of the invention. Often times keys may have matching geometrical features on shank 4 but will vary greatly in the shape of head 3.

BRIEF DESCRIPTION OF THE DRAWINGS

FIG. 1A illustrates a side elevational view of a key blank.

FIG. 1B illustrates a front cross-sectional view of a key blank.

FIG. 2A illustrates a side elevational view of a key uniquely notched.

FIG. 2B illustrates a front cross-sectional view of a key uniquely notched.

FIG. 3A illustrates a front cross-sectional view of a key blank with a similar shank to that of FIGS. 1B and 2B but with a different top.

FIG. 3B illustrates a front cross-sectional view of a key blank with a similar shank to that of FIG. 3A but with a different top.

DESCRIPTION OF THE PREFERRED EMBODIMENT(S)

Figure 4C:
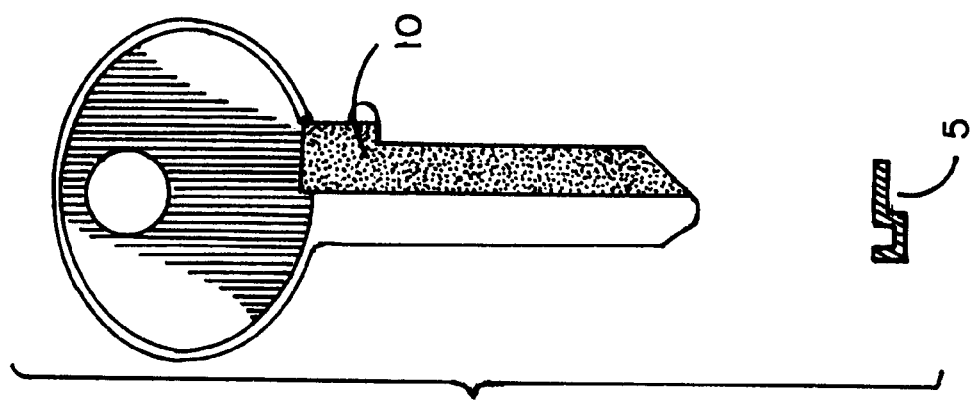
FIG. 4C illustrates a side elevational view and respective front cross-sectional view of a yet additional different key blank from that of FIGS. 4A and 4B.
Figure 4B:
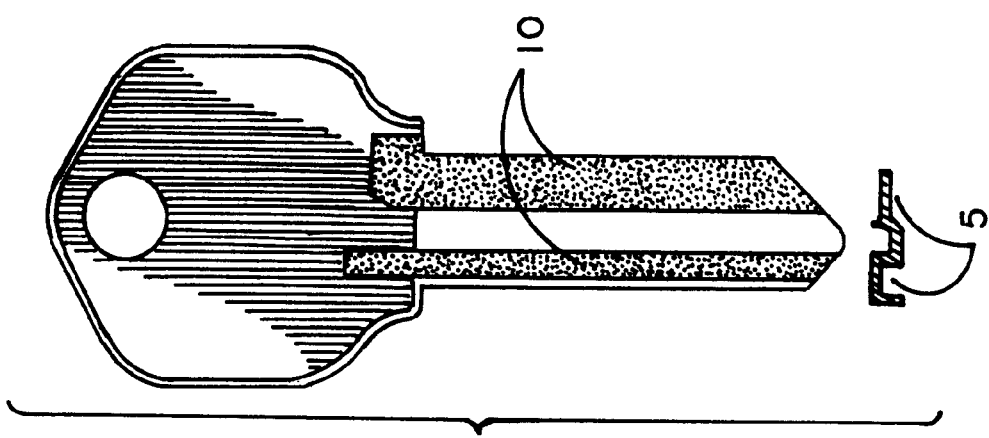
FIG. 4B illustrates a side elevational view and respective front cross-sectional view of a different key blank from that of FIG. 4A.
Figure 4A:
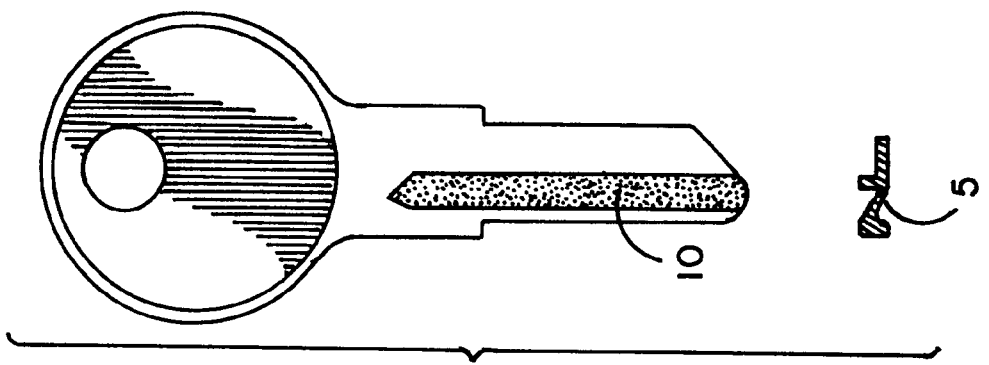
FIG. 4A illustrates a side elevational view and respective front cross-sectional view of a key blank.
Figure 5A:
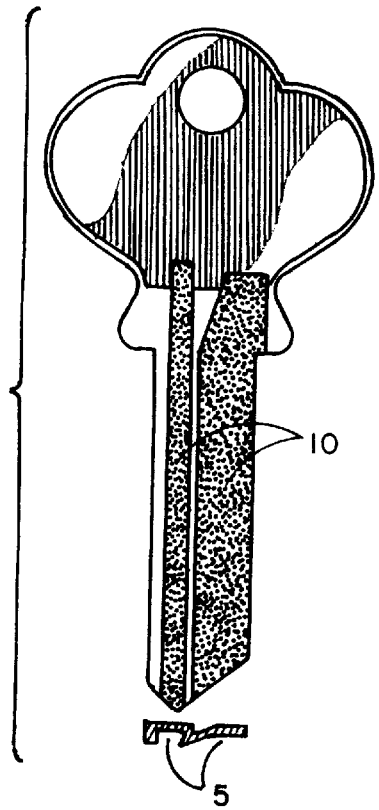
FIG. 5A illustrates a side elevational view and respective front cross-sectional view of a key blank.
Figure 5B:
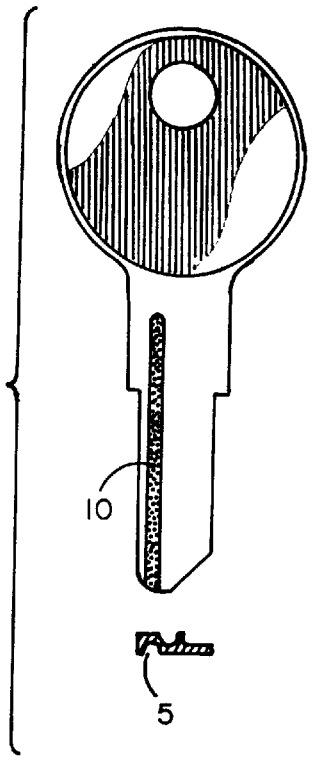
FIG. 5B illustrates a side elevational view and respective front cross-sectional view of a different key blank from that of FIG. 5A.
Figure 5C:
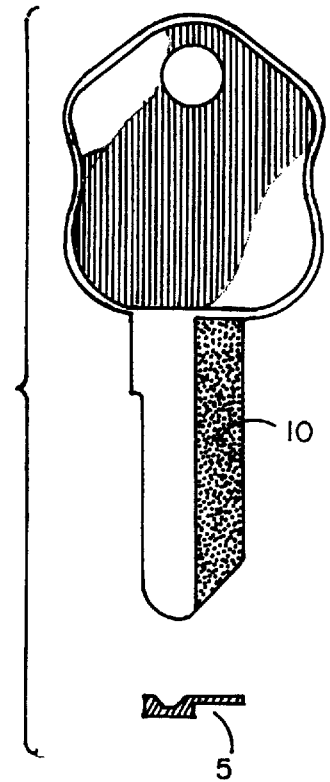
FIG. 5C illustrates a side elevational view and respective front cross-sectional view of a yet additional different key blank from that of FIGS. 4A and 4B.

A standard key 1, as shown in FIGS. 1A and 2A, has a head 3 and a shank 4. For purposes of explanation the flat sides 9 and 11 of shank 4 are positioned vertically, and shank 4 is extended horizontally in relationship to head 3. Along the sides of shank 4 are grooves and indentations 5, The grooves and indentations are unique to individual key manufacturers. Vertical notches 6 along top 7 of shank 4 and at times along bottom 8 of shank 4 transform the key blank of FIG. 1A into a key 1 uniquely notched for a particular lock. In order to image the grooves and indentations 5 and 10 according to the invention, two approaches are possible. First, as shown in FIGS. 1A and 2A, the geometrical shapes of the grooves and indentations 10 left on head 3 of key 1 directly reflect the shape of grooves and indentations 5 seen in FIGS. 1B and 2B and thus, imaging the head of the key from a side view can be used to select a key blank. Since the geometrical shapes of traces of grooves and indentations 10 left on head 3 of key 1 are not affected by the notchings on top 7 of key 1 of FIG. 2A, a more accurate key blank selection can be made. Second, imaging shank 4 (or part of the shank) from a side elevational view, according to this invention, provides the larger surface area of the grooves and indentations 10 of key 1 and thus allows for determination of the spatial relationship of the grooves and indentations to one another. FIGS. 4A–4C and 5A–5C illustrate examples of different side elevational view of different key blanks and their respective front cross-sectional views.

Figure 6:
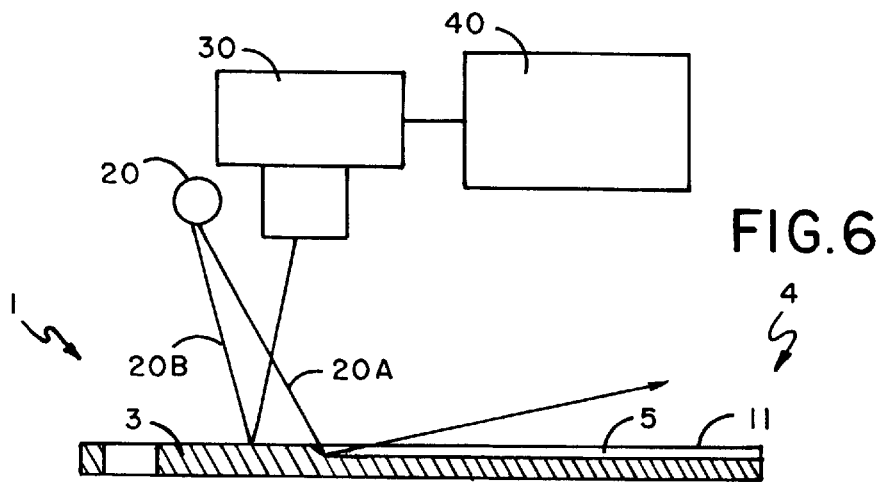
FIG. 6 illustrates a system block diagram of the present invention.

Whether one desires to use the first or second approach, i.e. to image the head and/or whole or part of the shank, a typical embodiment of the apparatus of the present invention is illustrated in FIG. 6. In FIG. 6 key 1 is placed horizontally with the wide side of shank 4 facing up towards light source 20 which is situated directly over head 3 of key 1 for proper directional illumination of the wide side of shank 4 of key 1. Digital video camera/scanner 30 is positioned directly over shank 4 of key 1 for image acquisition of key 1. Computer 40 is linked to digital video camera/scanner 30 for interpretation, storage and comparison of acquired images of key 1.

An exemplary operation of the apparatus/system of this invention is as follows. Key 1 is placed on a wide surface with the flat side of shank 4 positioned facing up and toward light source 20 which is situated over head 3 of key 1 which illuminates the key shank and/or head. Thus, light rays will strike all flat and convoluted surfaces of key 1, producing (a) a direct image of key 1 and (b) shadow images of traces of grooves and indentations 5 of shank 4 which represent the convoluted grooves and indentations 5 and 10 of shank 4 on key 1. The direct images are formed when light rays 20B emitted by light source 20, as seen in FIG. 6, are reflected directly back into the digital video camera/scanner 30. The direct images will reveal a wide range of data relative to key 1 such as the shape of key 1; the shape of head 3 of the flat, reflective portions of key 1; the length of shank 4 of key 1; and the individual, unique notchings of top 7 of shank 4 of key 1. The images which are shown in FIGS. 4A–4C and 5A–5C as a white area of the grooves and indentations 5 on shank 4 of key 1 are formed when light rays 20A strike the convoluted surfaces of grooves and indentations 5, The convoluted surfaces will not reflect the light rays directly into digital video camera/scanner 30 as will flat surfaces, thereby producing an image of grooves and indentations 5 on shank 4 of key 1. Both sets of images, direct as well as shadow, will be acquired by digital video camera/scanner 30. The flat surfaces of key 1 are white in appearance, and the convoluted surfaces of grooves and indentations 5 are black. The sharp distinction/contrast between black and white images will allow for automatic, precise image acquisition, interpretation and comparison in the process of determining the shape of the grooves and indentations. This relayed image is sent to computer 40 for interpretation, storage and comparison to a data base of previously scanned uncut key blanks. Furthermore, key 1 can be turned over for the examination of the opposite side of shank 4 if such examination is deemed necessary. Thus the present invention allows for the evaluation of the grooves and indentations of a key as well as the surrounding reflective surfaces for the purpose of precise automatic key identification. The advantages of evaluation of images and of the lateral surface of shank 4 over the front cross-section are as follows. First, the geometrical features of the lateral wide surfaces of shank 4 of key 1 remain unchanged even when the key is uniquely notched and thus images of the scanned surfaces of a uniquely notched key will not differ from a key blank. Second, the lateral surfaces of shank 4 of key 1 do not participate in the actual operation of the key and therefore are not subjected to tremendous wear and tear which may cause changes in the geometric shape of the grooves and indentations. Therefore, the key identification process according to the present invention is more reliable. Third, the large geometrical features of grooves and indentations 5 on shank 4 which run throughout the whole length of the scanned lateral surfaces of key 1 provide for a more precise automated identification. Fourth, the color contrast between direct images (white) and those of the grooves and indentations (black) also provides for a more precise automated identification. Further, the evaluation of the direct images of the wide surfaces of key 1 will allow for the evaluation of additional characteristics of key 1 which were not previously available using prior art methods which rely on the examination of the front cross-section of the key. This evaluation of additional characteristics is important since different models of keys may have identical sets of grooves and indentations but have different lengths of shank or have different shapes of head 3 of key 1 which features may be used for a more detailed evaluation of the original. Thus the length of shank 4 may be determined along with the unique notchings of top 7 of shank 4. More specifically the present invention can provide data regarding the following: the shape of head 3 and the total shape of the key including the shank and head.

The method disclosed in this embodiment does not require the use of a holding device, but instead the key is to be placed on a flat surface for precise identification. This is a further advantage of this invention scanning system which excludes the use of a holding device which is vital for the evaluation of a front cross-section as used in the prior art.

We claim:

1. A key imaging system for identifying and matching a key blank when duplicating an original key, said original key having a head and a shank, said shank having a length and at least one side with a light-reflective surface, said side having a pattern of grooves and indentations defined therein which scatter light, said system comprising:

a supporting flat surface for supporting said original key, said original key disposed with said side with said grooves and indentations facing up;

a light source disposed relative to said supporting flat surface above said head to illuminate and image said light-reflective surface side of said head and said shank having said grooves and indentations;

recording means for recording light reflected by said light-reflective surface of said shank as a first shade and imaging said grooves and indentations which scatter light as a second shade different from said first shade;

a computer device for selecting a key blank having a similar pattern of grooves and indentations, shank length, and shape and size of said head to that of said original key;

wherein said light source images said head and said side of said shank having said grooves and indentations such that the resulting image reveals said grooves and indentations in said head and said shank of said original key, the length of said original key, and the shape and size of said head of said original key.

2. The key imaging system of claim 1 further including an identifying device for comparing the size and shape of said head, said pattern of grooves and indentations and said length of said original key to a key blank for proper identification.

\* \* \* \* \*